US012625802B2

(12) United States Patent
Deschenes et al.

(10) Patent No.: US 12,625,802 B2
(45) Date of Patent: May 12, 2026

(54) TECHNIQUE FOR POWER OPTIMIZED MEMORY POOLS

(71) Applicant: Silicon Laboratories Inc., Austin, TX (US)

(72) Inventors: Jean Francois Deschenes, Ste-Marthe-sur-le-lac (CA); Cedric Migliorini, Roxoboro (CA)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/886,421

(22) Filed: Sep. 16, 2024

(65) Prior Publication Data

US 2026/0079826 A1 Mar. 19, 2026

(51) Int. Cl.
*G06F 12/00* (2006.01)
*G06F 12/02* (2006.01)

(52) U.S. Cl.
CPC .................................. *G06F 12/023* (2013.01)

(58) Field of Classification Search
CPC .............. G06F 12/023; G06F 12/0292; G06F 2212/00; G06F 2212/1028
See application file for complete search history.

(56) References Cited

U.S. PATENT DOCUMENTS

| | | | | |
|---|---|---|---|---|
| 5,638,506 A | * | 6/1997 | Peterson ............. | G06F 12/0866 711/E12.019 |
| 2005/0154851 A1 | * | 7/2005 | Charles ................ | G06F 12/023 711/170 |
| 2010/0070695 A1 | * | 3/2010 | Baek ..................... | G06F 12/023 711/E12.001 |

* cited by examiner

*Primary Examiner* — Shawn X Gu

(74) *Attorney, Agent, or Firm* — Nields, Lemack & Frame, LLC

(57) ABSTRACT

A system and method for allocating blocks from a memory pool is disclosed. The memory is made up of a plurality of banks, wherein the power to each is independently controlled. Several linked lists are used to ensure that blocks are always allocated from the bank with the fewer free blocks. In this way, the possibility of having banks where all of their blocks are unallocated is increased, and these banks may be powered off during deep sleep mode. The linked lists track the location of the free blocks in each bank, and the number of free blocks in each bank.

17 Claims, 11 Drawing Sheets

70

FREE COUNT ENTRY

FREE COUNT NUMBER 71

72 PREV

NEXT 73

74 BANK HEAD

TECHNIQUE FOR POWER OPTIMIZED MEMORY POOLS

FIELD

This disclosure describes systems and methods for allocating and pools of volatile memory.

BACKGROUND

Many wireless protocols, such as Bluetooth Low Energy (BLE) and others, are enabling the Internet of Things (IOTs). One aspect of these IOT devices is their low power consumption, often allowing them to operate for extended periods of time using a battery. This is often accomplished by placing the device into a low power sleep mode. In this deep sleep mode, many components may be powered down, such as the network interface, the processing unit and others. Therefore, in deep sleep mode, one of the largest consumers of power is the volatile memory device.

To combat this issue, the volatile memory in these devices may be divided into banks, where each bank may be powered on or powered off independently. Thus, if a bank is unused, or only contains data that is disposable, this bank may be powered off during the deep sleep mode. On the other hand, if a bank contains instructions, a network stack, or other important information, it may remain powered during the deep sleep mode so that the information is retained.

These banks are typically relatively large, such as 16 Kbytes or larger. Thus, the allocation of information into the volatile memory is key to determining how many of the memory banks may be powered off during deep sleep mode.

Thus, an improved method and system for allocating pools of memory so as to minimize the number of banks that must remain powered during deep sleep mode would be beneficial.

SUMMARY

A system and method for allocating blocks from a memory pool is disclosed. The memory is made up of a plurality of banks, wherein the power to each is independently controlled. Several linked lists are used to ensure that blocks are always allocated from the bank with the fewer free blocks. In this way, the possibility of having banks where all of their blocks are unallocated is increased, and these banks may be powered off during deep sleep mode. The linked lists track the location of the free blocks in each bank, and the number of free blocks in each bank.

According to one embodiment, a method of organizing and allocating blocks from a pool of memory, wherein the pool comprising a plurality of blocks disposed in a plurality of banks, is disclosed. The method comprises creating a first linked list to identify free blocks in a bank, wherein the first linked list comprises block structures, each of which points to a free block in a respective bank; creating a second linked list to identify the banks that have a same number of free blocks, wherein the second linked list comprises bank structures; creating a third linked list comprising free count entry structures, wherein each free count entry structure is associated with a specific number of free blocks and the third linked list of free count entry structures is arranged in ascending order of free blocks; pointing a memory pool list head to a head of the third linked list; receiving a request from user level software for a free block; and traversing the third linked list, the second linked list and the first linked list to find a next free block to be allocated to the user level software.

In some embodiments, a time to find the next free block to be allocated to the user level software is deterministic. In some embodiments, the next free block is allocated from the bank with the fewest free blocks.

In some embodiments, the free count entry structure comprises: a next pointer to a next free count entry structure in the third linked list; a previous pointer to a previous free count entry structure in the third linked list; a free count number, which is a number of free blocks disposed in each bank associated with this free count entry structure; and a bank head pointer to a first bank structure that comprises the number of free blocks associated with this free count entry structure. In certain embodiments, the bank structure comprises: a next bank pointer to a next bank structure in the second linked list; a previous bank pointer to a previous bank structure in the second linked list; and a block head pointer to a first block structure associated with the bank. In certain embodiments, the bank structure comprises a pointer to an associated free count entry structure. In certain embodiments, the block structure comprises: an address of a block; and a next block pointer to a next block structure in the first linked list.

In certain embodiments, the next free block is determined by: using the bank head pointer disposed in the free count entry structure pointed to by the memory pool list head to find a bank structure having a minimum number of free blocks; using the block head pointer in the bank structure having the minimum number of free blocks to find a first block structure in the bank; and returning the address of the block found in the first block structure as the address of the next free block.

In certain embodiments, the method includes updating the first linked list, the second linked list and the third linked list after the block has been allocated. In certain embodiments, the first linked list is updated by setting the block head pointer of the bank structure to the address found in the next block pointer of the block structure of the block that was allocated. In certain embodiments, the second linked d list is updated by decoupling the bank structure from the second linked list. In certain embodiments, the third linked list is updated by attaching the bank structure to a free count entry structure that has a free count number that is one less than the free count entry structure that the bank structure was previously attached to. In certain embodiments, the free count entry structure that has a free count number that is one less than the free count entry structure that the bank structure was previously attached to already exists, and the bank structure is incorporated into the free count entry structure. In certain embodiments, the free count entry structure that has a free count number that is one less than the free count entry structure that the bank structure was previously attached to does not exist, and the method further comprises creating a new free count entry structure and attaching the bank structure to the new free count entry structure.

According to another embodiment, a device is disclosed. The device comprises a processing unit; a data memory device comprising a plurality of banks which may be powered independently; a memory device, in communication with the processing unit, comprising instructions, which when executed by the processing unit, enable the device to: use a first linked list, a second linked list and a third linked list to determine an address of a free block to allocate to user level software, wherein the free block to be allocated is disposed in the bank having a fewest number of free blocks.

In some embodiments, the first linked list is used to identify free blocks in a bank, and the first linked list comprises block structures, each of which points to a free block in a respective bank. In some embodiments, the second linked list is used to identify the banks that have a same number of free blocks, and wherein the second linked list comprises bank structures. In some embodiments, the third linked list comprising free count entry structures, wherein each free count entry structure is associated with a specific number of free blocks and the third linked list of free count entry structures is arranged in ascending order of free blocks.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
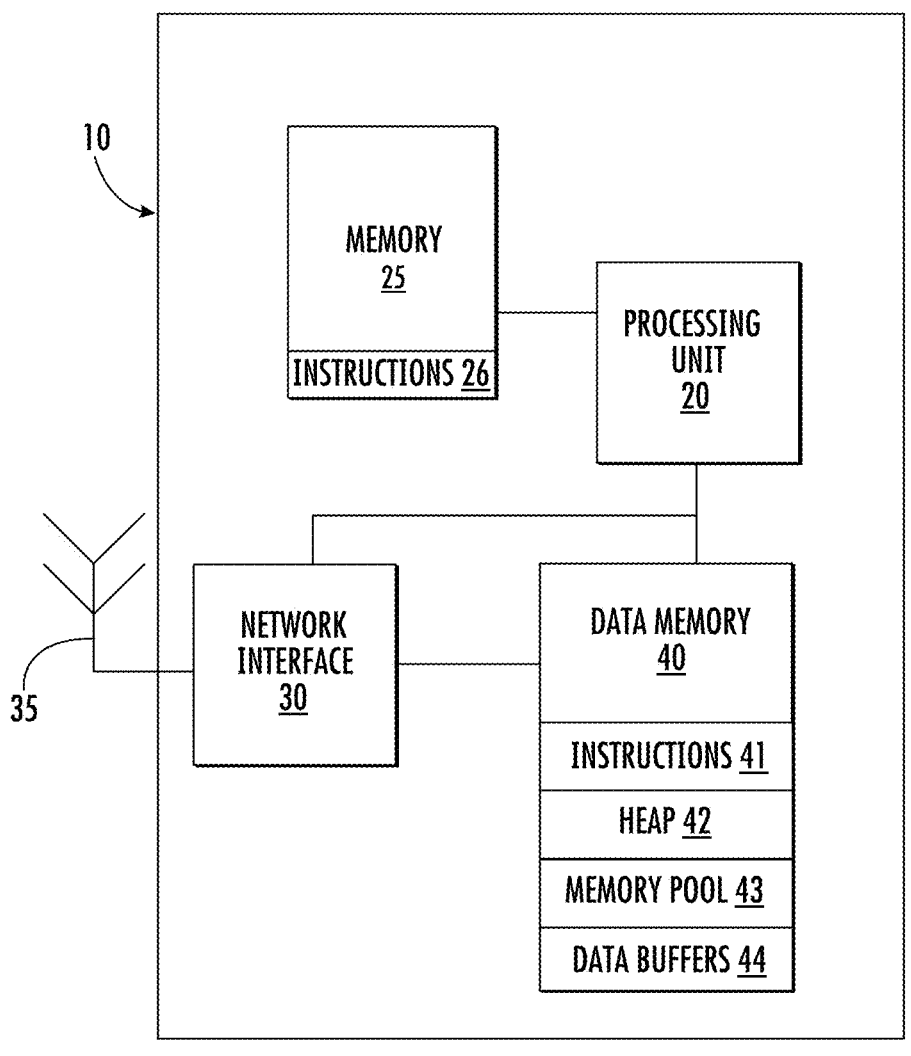
FIG. 1 shows a block diagram of a wireless network device that may utilize the memory allocation scheme described herein.

FIG. 1 shows a block diagram of a representative network device 10 that is able to minimize the number of memory banks that must remain powered during deep sleep mode according to one embodiment.

The network device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions 26, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device may be a volatile memory, such as a RAM or DRAM.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

The network device 10 also includes a network interface 30, which may be a wireless interface that connects with an antenna 35. The network interface 30 may support any wireless network, such as Bluetooth, Wi-Fi, networks utilizing the IEEE 802.15.4 specification, such as Zigbee and Wi-SUN, networks utilizing the IEEE 802.15.6 specification, and wireless smart home protocols, such as Z-Wave. Further, the network interface 30 may also support a proprietary or custom wireless network. The network interface includes a transmit circuit which is used to transmit data from this network device 10 using the antenna 35. The network interface also includes a receive circuit which is used to receive packets.

The network device 10 may include a data memory device 40 in which data that is received and transmitted by the network interface 30 is stored. This data memory device 40 is traditionally a volatile memory. The processing unit 20 has the ability to read and write the data memory device 40 so as to communicate with the other nodes in the wireless network. Although not shown, the network device 10 also has a power supply, which may be a battery or a connection to a permanent power source, such as a wall outlet.

While the processing unit 20, the memory device 25, the network interface 30, and the data memory device 40 are shown in FIG. 1 as separate components, it is understood that some or all of these components may be integrated into a single electronic component. Rather, FIG. 1 is used to illustrate the functionality of the network device 10, not its physical configuration. Further, while the above describes a network device, it is understood that this technique is applicable to any device that seeks to limit power consumption while in deep sleep mode.

Further, the data memory device 40 may be segmented into a plurality of banks, wherein each bank may be independently powered. In this way, any or all of the banks may be powered on or off during deep sleep mode.

Additionally, as shown in FIG. 1, the data memory device 40 may be used to retain many types of information. For example, for speed of execution, some or all of the instructions 26 in the memory device 25 may be copied to the data memory device 40 and saved as instructions 41. Ideally, these instructions 41 are located in one or more banks that remain powered during deep sleep mode.

Additionally, the data memory device 40 is also used to hold data buffers 44. These data buffers 44 may represent data that has been received from the network interface 30 or will be transmitted using the network interface 30. Typically, the network device 10 does not enter deep sleep mode if there are any data buffers that have not been processed. Thus, the data buffers 44 may be located in one or more banks that are powered off during deep sleep mode.

Additionally, there is another section of the data memory device 40 that may be referred to as the heap 42. The heap 42 includes variables or areas that are utilized by the various software applications and modules that are executed by the processing unit 20. Consequently, it may be difficult to determine whether the banks that are used for the heap 42 should remain powered during deep sleep mode.

Figure 2:
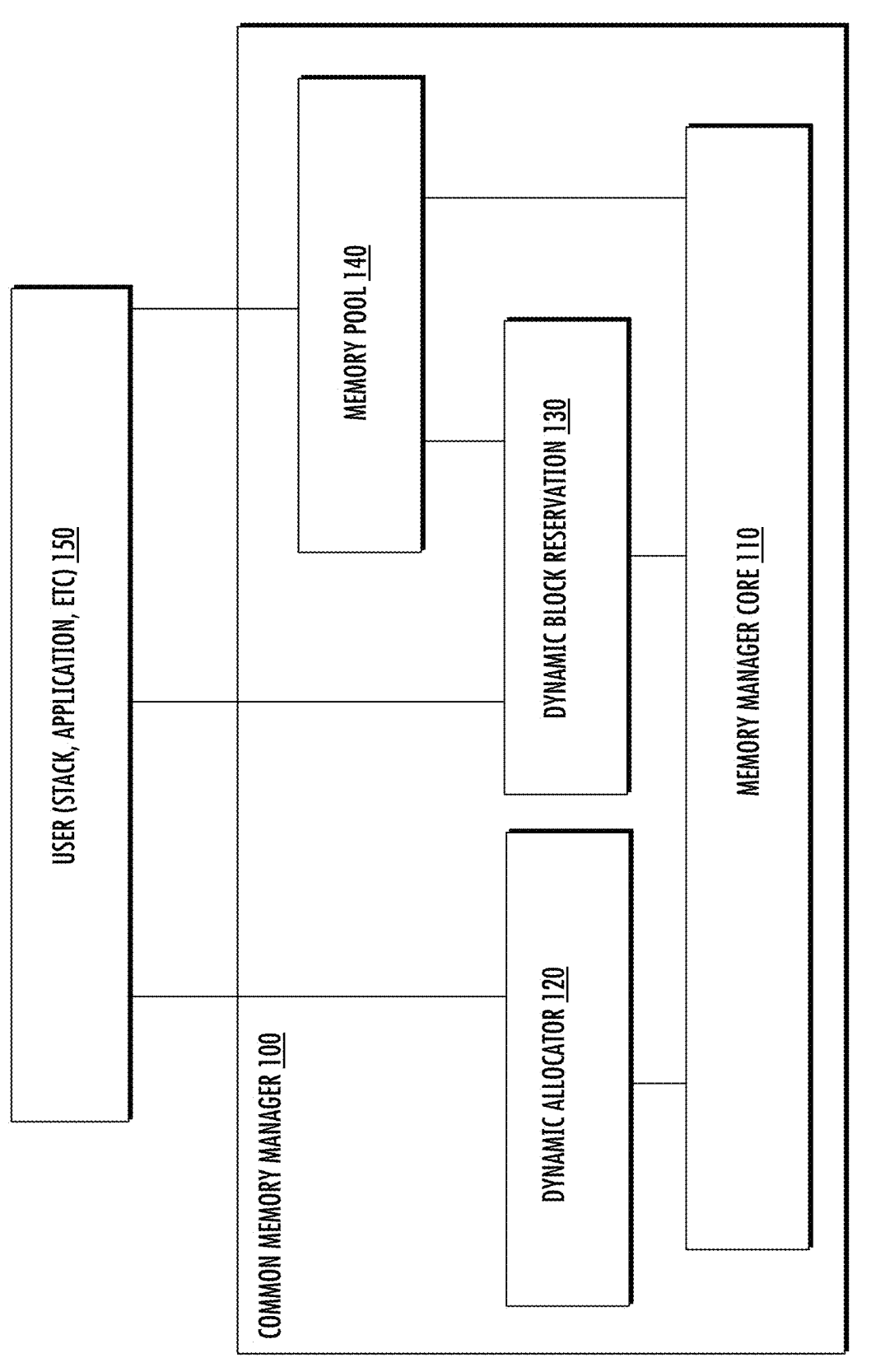
FIG. 2 shows a block diagram of the memory manager according to one embodiment.

To coordinate the allocation of memory, a software module, referred to as the memory manager 100 is included, as shown in FIG. 2. A software module represents a set of instructions that, when executed by the processing unit 20, perform the functions described for that module.

The memory manager 100 may include a memory manager core 110, a dynamic allocator 120, a dynamic block reservation module 130, and a memory pool module 140. The memory manager 100 communicates with higher level applications, such as network stacks, applications and other features, which may be defined as the user level software 150. The user level software 150 requests different operations from the memory manager 100. These operations include allocation of memory and release of previously allocated memory, among others.

Some of the components of the memory manager 100 are now described in more detail. The memory manager core 110 handles the high level partitioning of the data memory device 40. The memory manager core 110 may also reserve the blocks that never need to remain powered during deep sleep mode. These blocks may be assigned to data buffers 44, for example. The remaining memory may be configured as the heap 42. The heap 42 may span a plurality of banks of RAM, each of which may be powered on or off during deep sleep mode.

Thus, the memory manager core 110 also manages the various banks and their retention configurations. In this disclosure, the term "retention" is used to denote that the bank that contains a particular block must remained powered during deep sleep mode. The memory manager core 110 may utilize a plurality of counters, each associated with a respective bank. For example, at initialization, the counters associated with each bank that holds the heap 42 may be set to "0", which means that these banks may be powered off during deep sleep mode.

Whenever a block is allocated in one of these banks, the counter corresponding to that bank is incremented. Each time a block in that bank is released, the counter is decremented. The memory manager core 110 then updates the retention flag, which denotes that any non-zero value indicates that the bank must remain powered on during deep sleep mode.

The memory pool module 140 is responsible for allocating and releasing blocks of memory from the memory pool. Thus, this interface is similar to the malloc ( )/free ( ) functions used by the C language. In addition to allocating and releasing, the memory pool module 140 has several other objectives. First, it attempts to allocate blocks so as to minimize the number of banks that must remain powered during deep sleep mode. Second, it attempts to perform the allocation and release such that the time required to perform either of these operations is deterministic. The memory pool 43 resides within the heap 42.

Note that FIG. 2 shows one embodiment of the memory manager 100. However, in other embodiments, the memory manager 100 may be designed using different components. However, the functions of the memory manager 100 are as described herein.

Figure 3:
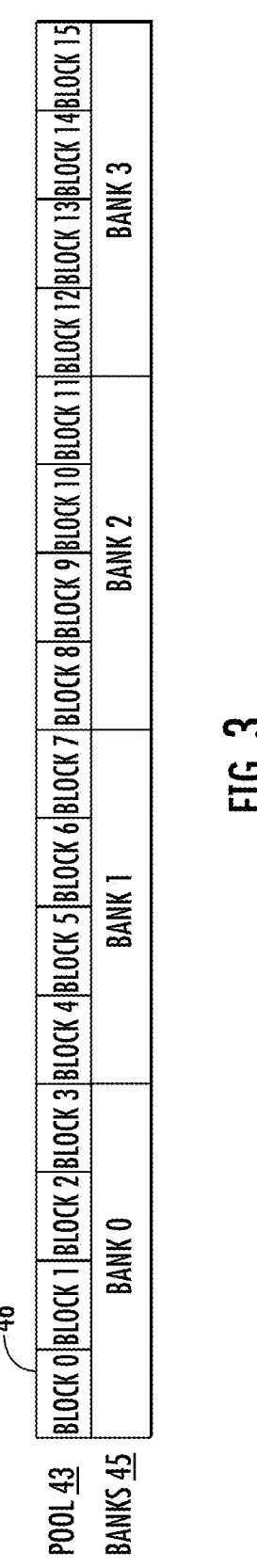
FIG. 3 shows the relationship between blocks and banks.

FIG. 3 shows the memory pool 43, which is divided into a plurality of blocks 46. FIG. 3 also shows that these blocks 46 may be disposed in a plurality of banks 45. Ideally, the memory pool module 140 allocates these blocks 46 such that one or more of the banks 45 contains no allocated blocks 46.

In this way, these one or more banks 45 may be powered off during deep sleep. To achieve this, the metadata associated with the blocks 46 is located in a different portion of memory that is more likely to be retained. This may be the portion that contains memory blocks near the start of the heap 42, for example.

Figure 4:
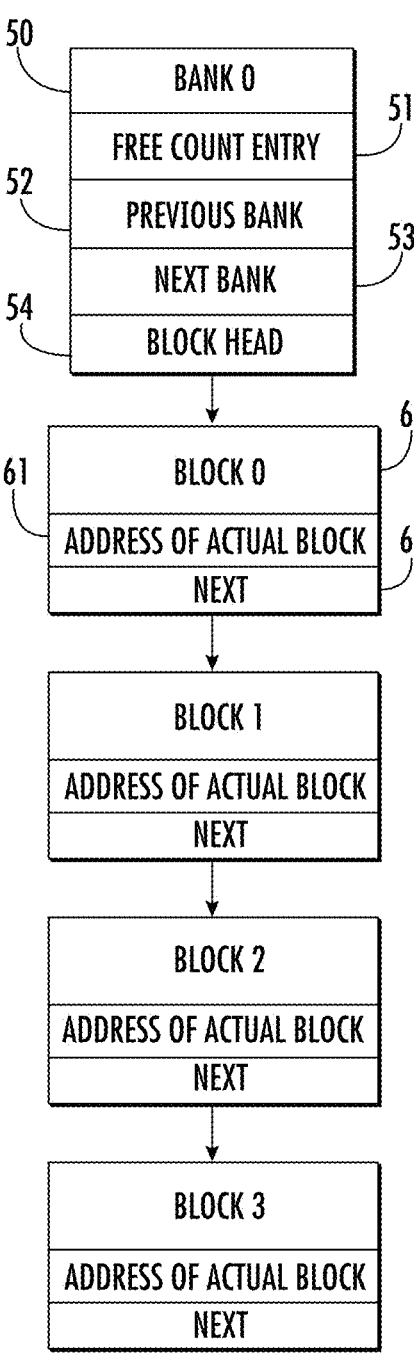
FIG. 4 shows the structure of the first linked list and the bank structure.

Therefore, rather than maintaining one list that includes all of the blocks 46, a different strategy is used where the list also includes a designation of the bank 45 that the block 46 belongs to. In fact, there are three separate lists that are used. Further, this strategy also ensures that the execution time of an allocate or free operation is deterministic. FIG. 4 shows a part of the data structure used for the memory pool 43.

Block structure 60 is the data structure used to form the first linked list. This block structure 60 includes the actual address 61 of the block. As noted above, all metadata for the memory pool 43 is typically stored in a different portion of the data memory device 40. Thus, this pointer identifies the actual address of the free block in the bank. The block structure 60 also include a next block pointer 62, which is a pointer to the block structure 60 for the next free block in this bank 45. This first linked list may be a single linked list. The order in which these fields appear in the block structure 60 is not limited to this arrangement; rather any order of these fields may be used.

This data structure also includes a bank structure 50. Each bank 45 that includes blocks 46 that are part of the memory pool 43 has an associated bank structure 50. Banks 45 that have the same number of free blocks are associated with one another using a linked list, referred to as the second linked list. The bank structure 50 includes a free count entry pointer 51 to the free count entry structure 70, which is explained in more detail below. Further, the bank structure 50 includes a previous bank pointer 52, which is the address of the previous entry in the second linked list, which is the previous bank having the same number of free blocks. If this is the first or only bank in that second linked list, the previous bank pointer 52 will be set to the NULL pointer. The bank structure 50 also includes a next bank pointer 53, which is the address of the next entry in the second linked list, which is the next bank having the same number of free blocks. If this is the last or only bank in that second linked list, the next bank pointer 53 will be set to the NULL pointer. Finally, the bank structure 50 includes a block head pointer 54, which is a pointer to the first entry in the first linked list, which, as described above, is a block structure 60. The bank structures 50 are used to form the second linked list, which may be a double linked list. Note that the bank structures 50 do not need to appear in any specific order in the second linked list.

Thus, as shown in FIG. 4, each bank 45 has an associated bank structure 50. This bank structure 50 points to the first entry in a first linked list of free blocks for that bank 45, wherein each entry in that first linked list is referred to as a block structure 60. If there are no free blocks in the bank 45, the block head pointer 54 will be the NULL pointer.

Figure 5:
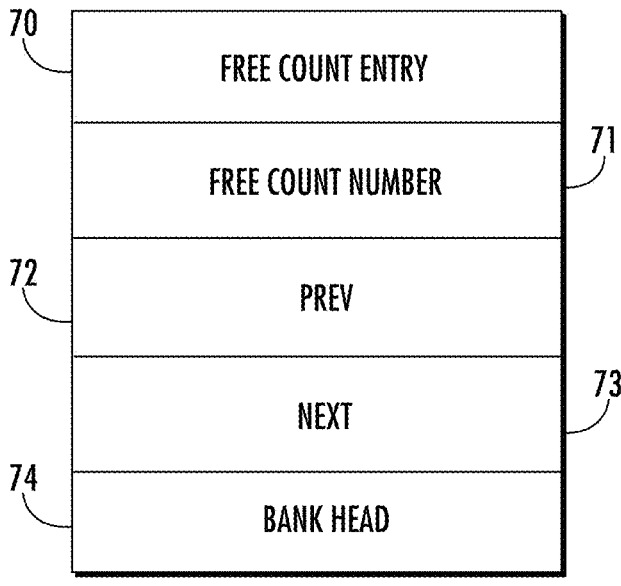
FIG. 5 shows the structure of the free count entry structure.

These data structures identify the location of free blocks within each bank. However, an additional data structure is used to track the number of free blocks in each bank 45. These additional data structures are referred to as free count entry structures 70, and are shown in FIG. 5. Each free count entry structure 70 includes the free count number 71, which is the number of free blocks in each bank that is associated with this free count entry structure 70. Note that all of the banks 45 that are linked to a particular free count entry structure 70 have the same number of free blocks, and that number is reflected in the free count number 71.

Note that these free count entry structures 70 are also part of a third linked list, where the third linked list is organized in ascending number of free count number 71, wherein the value of the free count number is 1 or more. To create this additional third linked list, each free count entry structure 70 includes a previous pointer 72 to the previous free count entry structure 70 (which has a smaller free count number 71) and a next pointer 73 to the next free count entry structure 70 (which has a greater free count number 71). Finally, the free count entry structure 70 includes a bank head pointer 74 that points to the first bank structure 50 that has the designated number of free blocks. If there are no banks that have the designated number of free blocks, the free count entry structure 70 associated with that number of free blocks may be deleted.

Thus, there are three different linked lists. There is a first linked list of all free blocks in a particular bank. There is a second linked list of all banks that have the same number of free blocks. This second linked list may be a doubly linked list. Finally, there is a third linked list of the free count entry structures 70. Again, this may be a doubly linked list.

Figure 6:
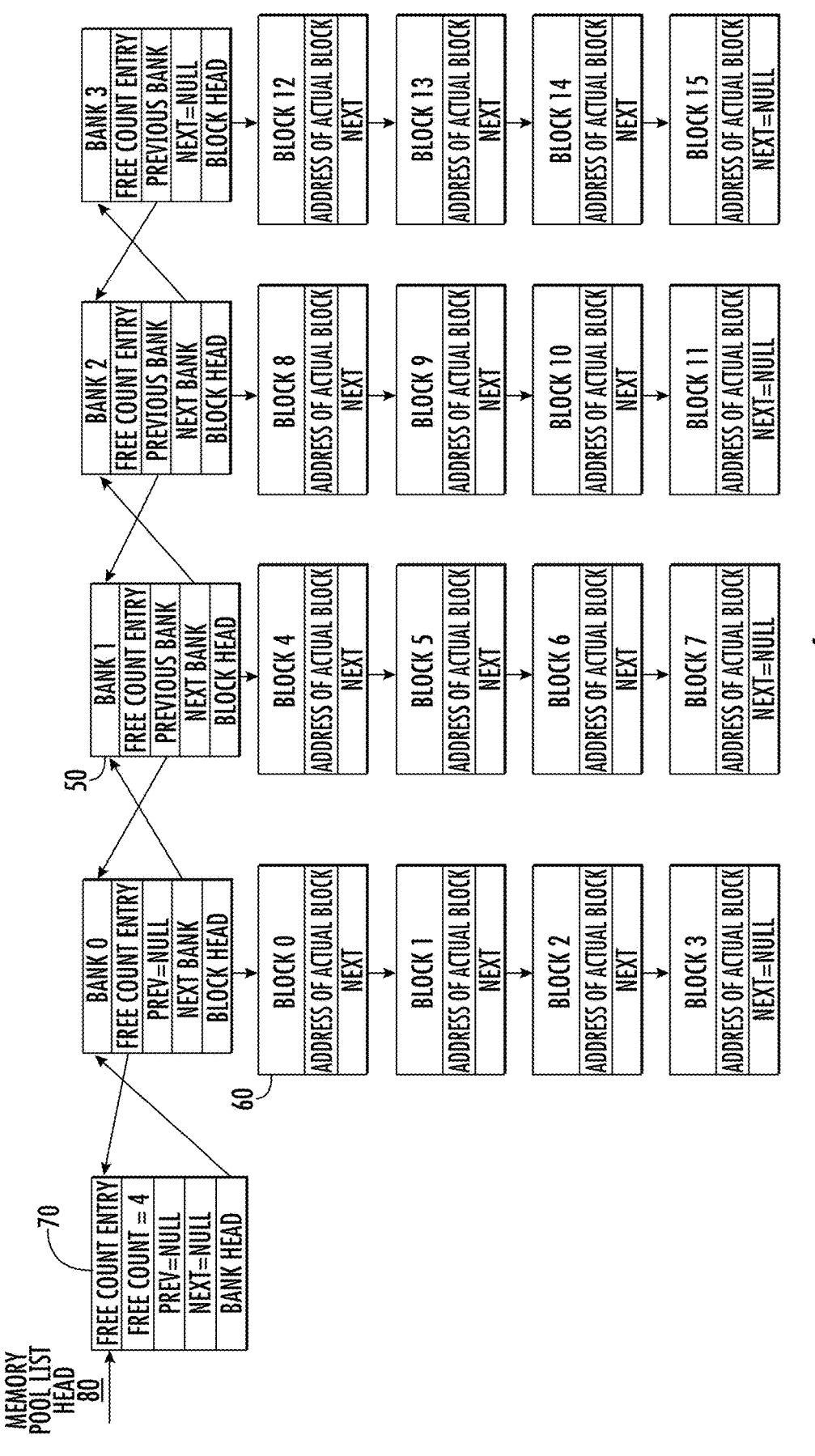
FIG. 6 shows the organization of the various data structures after initialization.

Having described the format of the free count entry structures 70, block structure 60, and bank structure 50, the operation of these structures will now be described. FIG. 6 shows the configuration of the data structures upon initialization. The data structures to manage these list elements all reside in a memory location that is not powered off during deep sleep. In this example, it is assumed that there are four banks 45, and each bank contains four free blocks. Thus, there is only one free count entry structure 70, which has a free count of 4, since all of the banks have 4 free buffers at this time. Also, this free count entry structure 70 is the only entry in the list so the previous pointer 72 and next pointer 73 are both set to the NULL pointer. Finally, the bank head pointer 74 points to the bank structure 50 for bank 0.

Bank structure 50 for bank 0 has its next bank pointer 53 pointing to the bank structure 50 for bank 1, and its previous bank pointer 52 set to the NULL pointer. Further, its block head pointer 54 points to the block structure 60 for Block 0. Finally, its free count entry pointer 51 points back to the free count entry structure 70 with a free count of 4. Similarly, the bank structure 50 for bank 1 has its next bank pointer 53 pointing to the bank structure 50 for bank 2, and its previous bank pointer 52 pointing to the bank structure 50 for bank 0. Further, its block head pointer 54 points to the block structure 60 for Block 4. Finally, its free count entry pointer 51 points back to the free count entry structure 70 with a free count of 4. The bank structures 50 for banks 2 and 3 are similarly configured, except the next bank pointer 53 of the bank structure 50 of Bank 3 is set to the NULL pointer.

Figure 8:
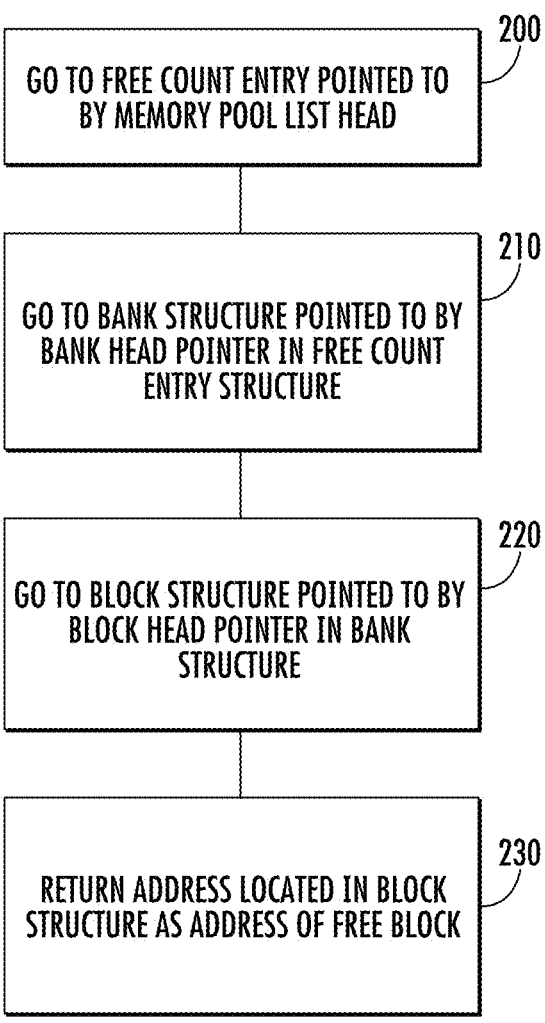
FIG. 8 is a flowchart describing the allocation of blocks.

This arrangement of three separate lists makes the allocation and release of blocks deterministic. First, the process of allocating a block is described and shown in FIG. 8. In operation, if a user level software 150 requests that a block be allocated, the memory pool module 140 notes that the memory pool list head 80 points to the free count entry structure 70 with the smallest free count number, as shown in Box 200. In the example shown in FIG. 6, this free count entry structure 70 has a value of 4 free blocks. The memory pool module 140 then follows the bank head pointer 74 to find the bank structure 50 for Bank 0, as shown in Box 210. It then uses the block head pointer 54 to identify the block structure 60 for Block 0, as shown in Box 220. It then returns the address found in the block structure 60 of Block 0 back to the user level software as the allocated block, as shown in Box 230.

Figure 9:
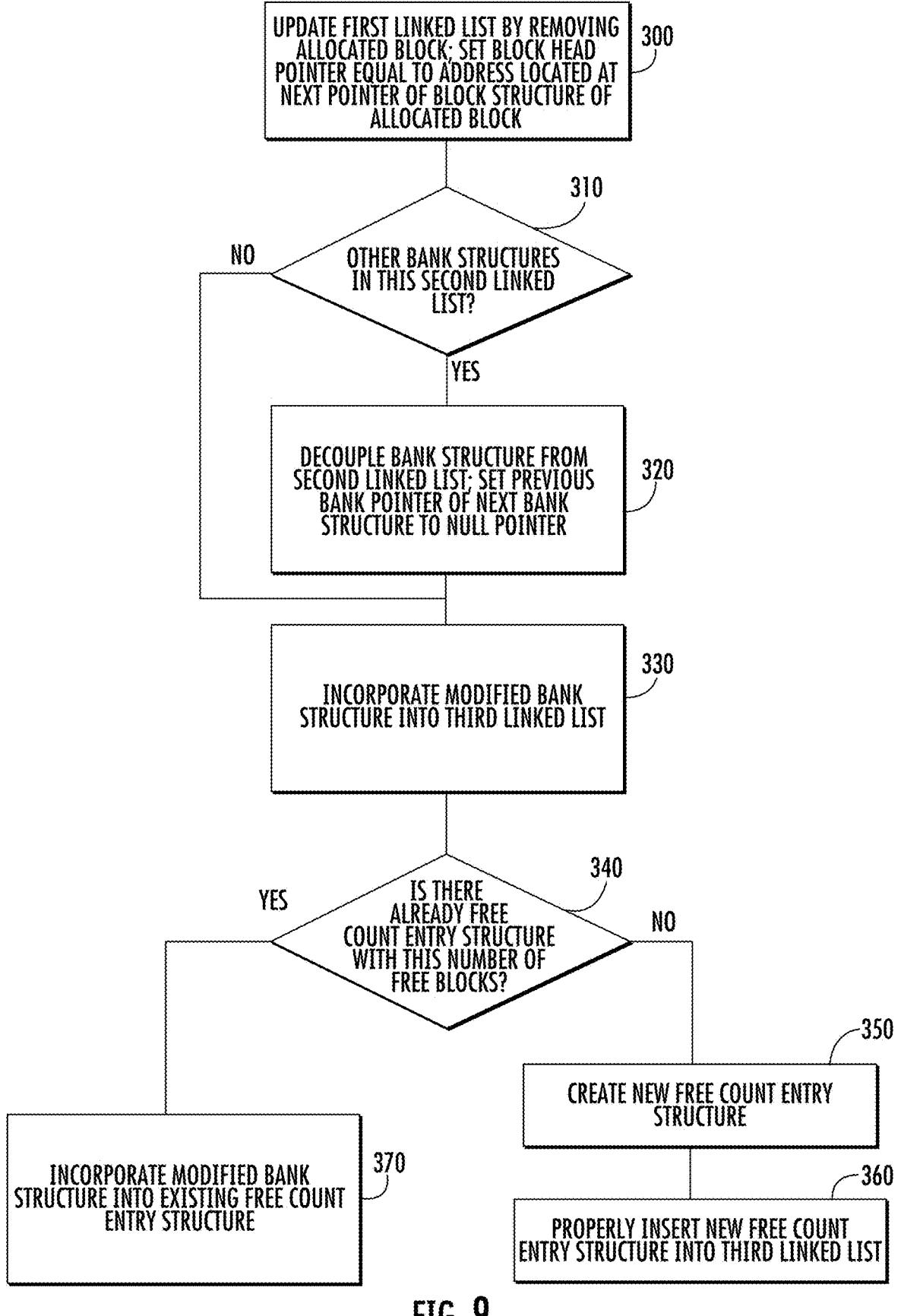
FIG. 9 is a flowchart showing the sequence to update the data structures after a block has been allocated.

Once the block has been allocated, the data structures must be updated. This process is shown in FIG. 9. First, the first linked list is updated by removing the block structure 60 for Block 0. As shown in Box 300, to do this, the address stored in the block head pointer 54 of the bank structure 50 for Bank 0 is set to the address that was stored in the next pointer of the block structure 60 for Block 0. In this way, the block head pointer 54 of the bank structure 50 for Bank 0 now points to the block structure for Block 1. Block 0 is now detached from the first linked list.

Additionally, Bank 0 now has fewer free blocks than the other banks, and therefore must be decoupled from the second linked list (if there are other bank structures in this list), as shown in Box 320. Thus, the previous bank pointer 52 for the bank structure of Bank 0 is copied into the previous bank pointer 52 for bank structure of Bank 1. This should always be the NULL pointer. Additionally, the bank head pointer for the free count entry structure 70 associated with 4 free blocks is updated to point to the bank structure 50 for Bank 1 (the address of which is located in the next bank pointer 53 of the bank structure 50 for Bank 0). Note that if there are no other banks in this second linked list, these two actions do not need to be taken. This is determined by checking if the next bank pointer is equal to the NULL pointer, as shown in Box 310. The next bank pointer 53 for the bank structure of Bank 0 is then set to the NULL pointer, since it is no longer part of this second linked list.

The bank structure 50 for Bank 0 now needs to belong to a different free count entry structure, one with 3 free blocks. Thus, the bank structure 50 for Bank 0 must be incorporated into the third linked list, as shown in Box 330. First, there is a check whether there already exists a free count entry structure that is associated with the new number of free blocks in Bank 0, as shown in Box 340. This is easily done by looking at the free count number 71 of the previous free count entry structure 70 in the third linked list. If a free count entry structure that is associated with the new number of free blocks in Bank 0 already exists, the free count entry pointer 51 of bank structure 50 for Bank 0 is linked to this free count entry structure, as shown in Box 370. This may be done by setting the next bank pointer 53 for Bank 0 equal to the value currently stored in the Bank head pointer 74 of this free count entry structure 70. Further, the previous bank pointer 52 for Bank 0 is set to the NULL pointer. Finally, the previous bank pointer 52 of the next bank structure in this third linked list (which is an existing bank structure that was previous at the head of the list) and the Bank head pointer 74 of the free count entry structure are both set to the address of the bank structure 50 of Bank 0. This adds Bank 0 to this existing free count entry structure.

In this particular example, since there is no free count entry structure 70 defined with a free count of 3, a new free count entry structure 70 is created, as shown in Box 350. Note that the free count entry structures in the third linked list are arranged in ascending order of free count number. Since its free count is smaller than the free count in the existing free count entry structure 70, it is placed ahead of that existing free count entry structure in the third linked list, as shown in Box 360. Specifically, since the new free count entry structure has a free count number that is one less than it previously had, it must be inserted directly before the free count entry structure 70 that the bank was previously linked to, which is referred to as the previous existing free count entry structure. Thus, the next pointer 73 of the new free count entry structure 70 points to the previous existing free count entry structure. This address may be found in the memory pool list head 80 if this new free count entry structure is the first entry in the third linked list. Otherwise, this address may be found in the next pointer 73 of the preceding free count entry structure. Further, its previous pointer 72 is set to the value previously stored in the previous pointer 72 of the previous existing free count entry structure. Additionally, the previous pointer 72 of the previous existing free count entry structure is now set to the address of this new free count entry structure. Finally, the next pointer 73 of the preceding free count entry structure 70 in the third linked list (if there is one), is updated to point to this new free count entry structure. In this particular example, the new free count entry structure 70 becomes the first item on the third linked list.

Thus, in this case, the memory pool list head 80 is modified to point to the new free count entry structure 70. Further, the previous pointer 72 for the new free count entry structure 70 is set to the NULL pointer, since it is first in the third linked list. Additionally, the next pointer 73 points at the previous existing free count entry structure 70 with a free count of 4. Finally, the previous pointer 72 of the previous existing free count entry structure points to the new free count entry structure.

Note that there are some optimizations that may be performed to the sequence shown in FIG. 9. For example, if the bank that just allocated a block is the only bank in the second linked list, and there is no free count entry structure 70 that already exists for the new free count for this bank, the existing free count entry structure 70 associated with this bank may simply be modified by decrementing its free count number 71.

Figure 7:
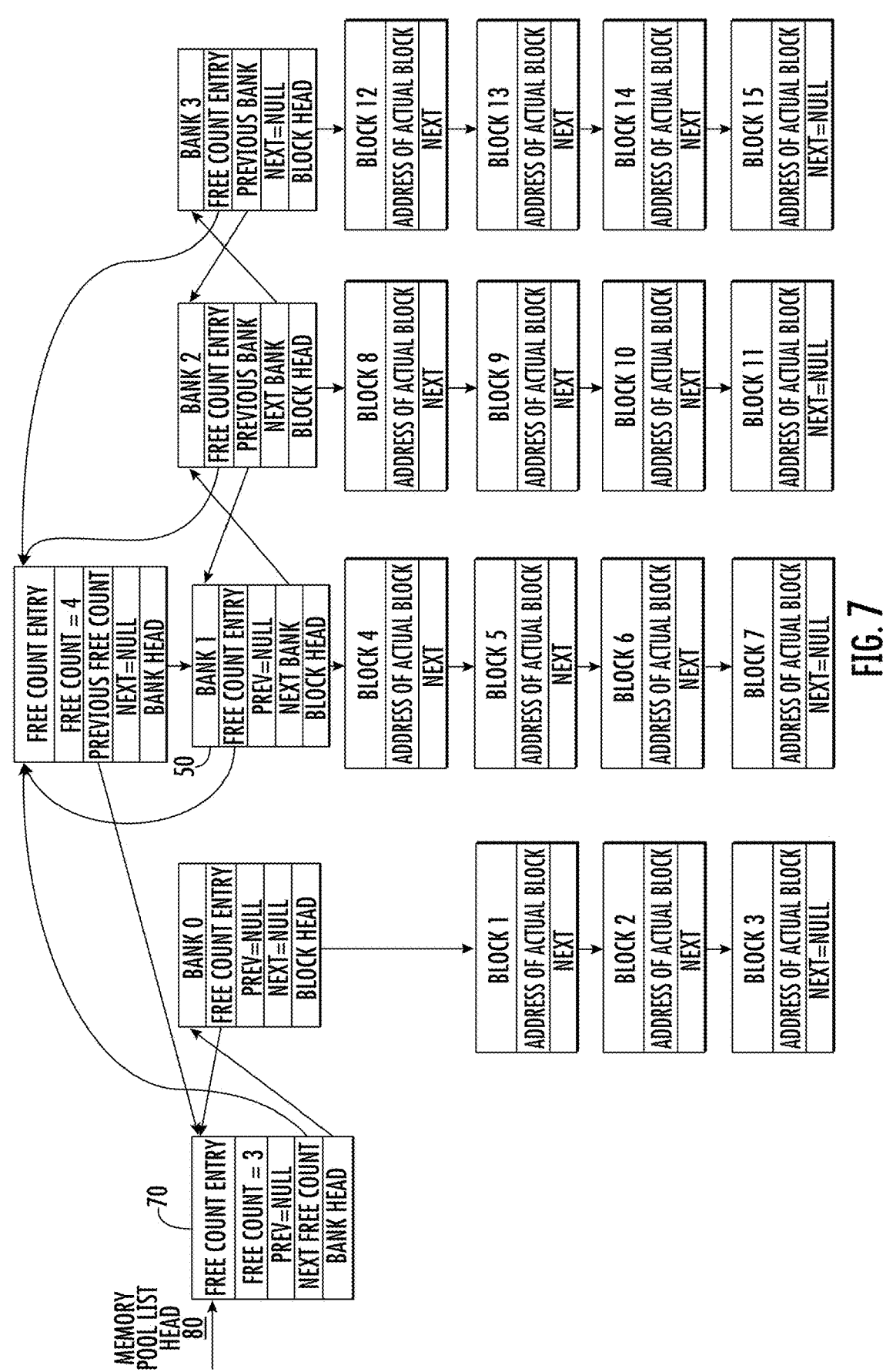
FIG. 7 shows the organization of the various data structures after one block has been allocated.

After these steps are performed to allocate a single block from Bank 0, the configuration of the data structures is as shown in FIG. 7. Note that if another block is requested, the sequence described above is repeated and Bank 0 will now have only 2 free blocks. Thus, the free count entry structure with a free count of 3 is modified to show a free count of 2. As noted above, this is possible since the previous bank pointer 52 and the next bank pointer 53 of the bank structure 50 of Bank 0 are both NULL pointers. Thus, there are no other banks associated with this free count entry structure 70. In this way, blocks are always allocated from the bank which already has the fewest free blocks. This may maximize the number of banks that have all of these blocks unallocated.

Figure 10:
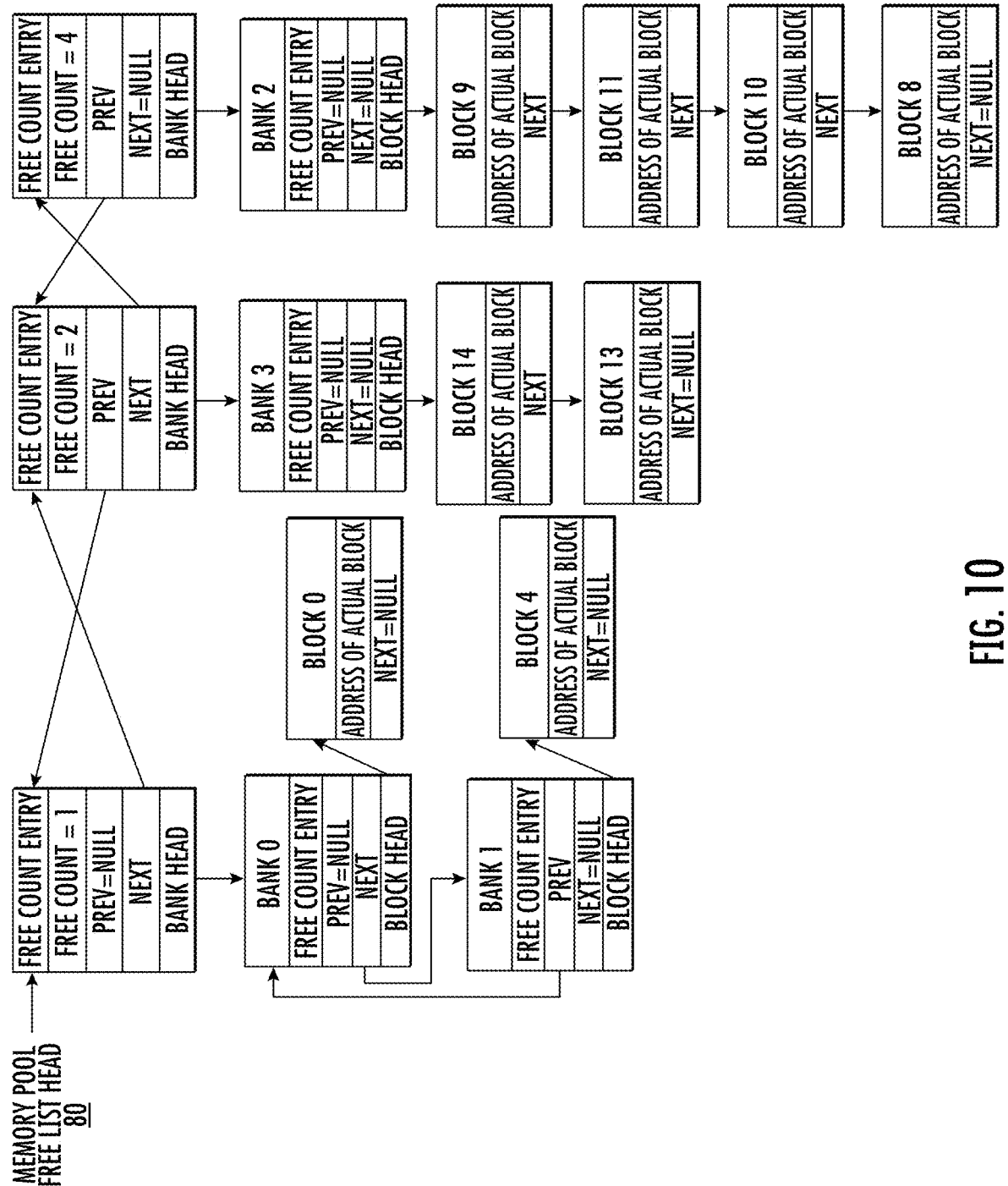
FIG. 10 the organization of the various data structures after many blocks have been allocated and released.
Figure 11:
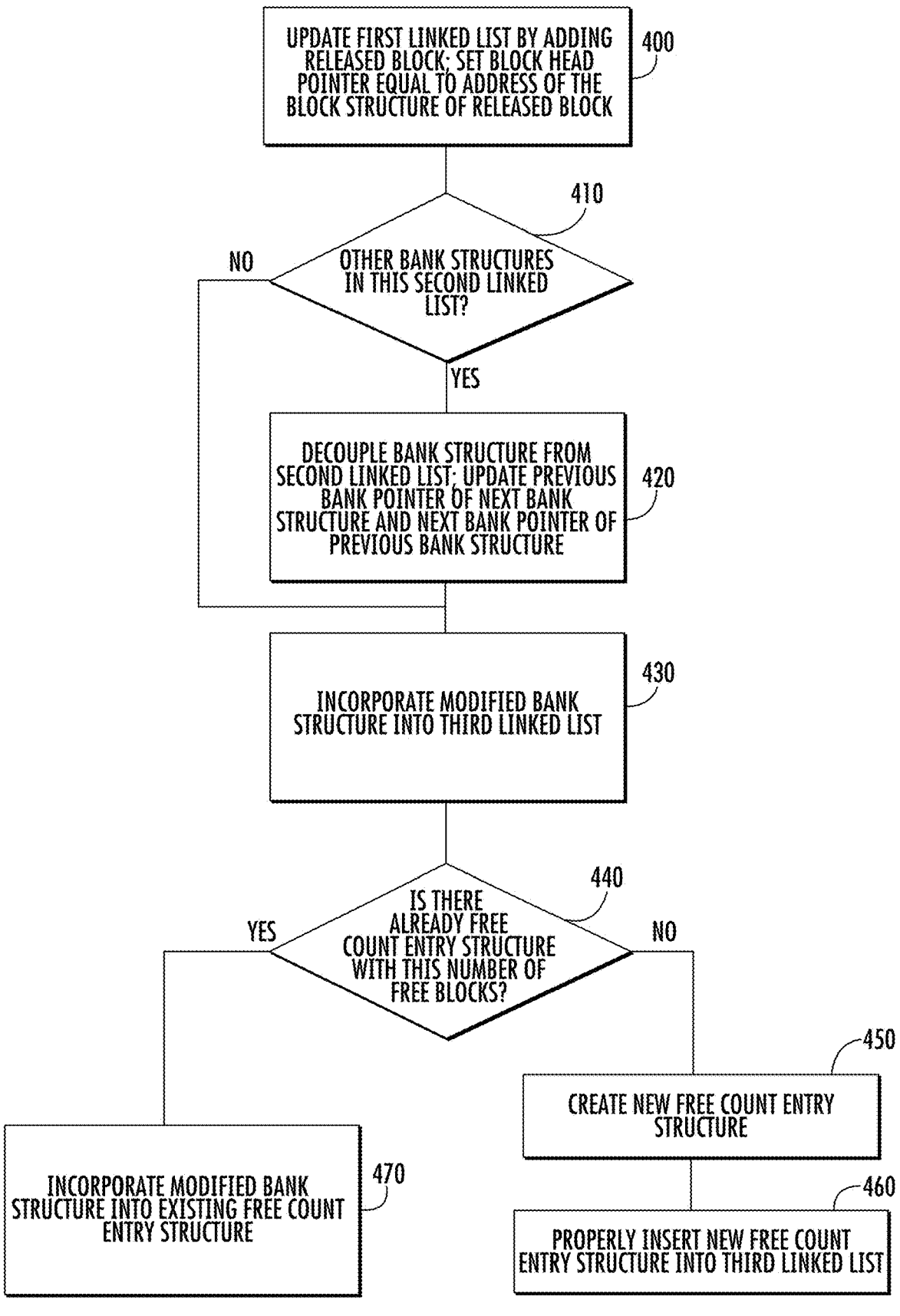
FIG. 11 is a flowchart showing the sequence to update the data structures after a block has been released.

The process of releasing blocks will be described with respect to FIG. 11. This process is basically the opposite of that described in FIG. 9. After some time, the data structures may be as seen in FIG. 10. Note that both Banks 0 and 1 have only 1 free block, while Bank 2 has 4 free blocks and Bank 3 has 2 free blocks. Assume that the block to be released is Block 5 of Bank 1. First, the released block needs to be incorporated into the appropriate first linked list, as shown in Box 400. Based on its address, it is simple to determine which bank the released block belongs to. Specifically, the address of the bank structure 50 associated with this released block is retrievable from a table. Once that it determined, the released block is inserted into the first linked list associated with that bank. This is done by updating the next block pointer 62 of the block structure 60 of the newly released block with the value contained in the block head pointer 54 of the bank structure 50 of Bank 1. The block head pointer 54 of the bank structure 50 of Bank 1 is then modified to point to the block structure 60 of the newly released block. Thus, in FIG. 10, Block would appear before Block 4 under the bank structure 50 for Bank 1.

Additionally, Bank 1 now has an additional free block, and therefore must be decoupled from the second linked list (if there are other bank structures in this list), as shown in Box 420. Thus, in this example, the next bank pointer 53 for the bank structure of Bank 1 is copied into the bank structure of Bank 0. Although not necessary in this example, the previous bank pointer 52 for the bank structure of Bank 1 is copied into the previous bank pointer 52 for the next bank structure in the second linked list. Note that if there are no other banks in this second linked list, no action needs to be taken. This is determined by checking if the previous bank pointer and the next bank pointer of Bank 1 are both equal to the NULL pointer, as shown in Box 410.

At this point, the first linked list has Block 5 and Block 4, and the bank structure 50 for Bank 1 has been detached from Bank 0. The bank structure 50 for Bank 1 must now be incorporated into the third linked list, as shown in Box 430. Since Bank 1 now has 2 free blocks, it needs to be added to the free count entry structure that is associated with a free count of 2. Since a block is being released, if there is a free count entry structure associated with a free count of 2, it would be located immediately after the free count entry structure that Bank 1 was previously part of in the third linked list. A check is then made to determine if this free count entry structure already exists, as shown in Box 440. To check this, the free count entry pointer 51 of the bank structure 50 for Bank 1 contains the address of the free count entry structure associated with a free count=1. The next pointer 73 in this free count entry structure 70 is a pointer to the next free count entry structure 70 that has more free buffers.

In FIG. 10, the next free count entry structure is associated with 2 free buffers. Thus, the bank structure for Bank 1 needs to be incorporated into this free count entry structure, as shown in Box 470. To do this, the next bank pointer 53 of Bank 1 is written with the value found in the bank head pointer 74 of the free count entry structure 70. Additionally, the previous bank pointer 52 in the bank structure 50 of Bank 1 is set to NULL. Additionally, the previous bank pointer 52 in the bank structure 50 of Bank 3 and the bank head pointer 74 of the free count entry structure associated with 2 free blocks are both updated to reflect the address of the bank structure 50 of Bank 1.

Note that if a free count entry structure associated with a free count of 2 did not exist, a new free count entry structure would be created, as shown in Box 450. This new free count entry structure would then be inserted into the third linked list immediately after the free count entry structure associated with a free count of 1, as shown in Box 460. The procedure for inserting a new free count entry structure 70 into the third linked list was described above.

Note that after this is completed, Bank 0, which has only one free block, is still pointed to by the memory pool list head 80. Thus, blocks are always allocated from the bank with the fewest free blocks.

Note that FIG. 3 assumes that blocks are completely contained within a single bank. However, in some embodiments, it is possible that one or more blocks span two banks. These blocks may be referred to as spanning blocks. In this case, the spanning blocks are not included in the data structures explained above. Rather, all of the spanning buffers are contained in a separate linked list. These spanning buffers are only allocated if all of the banks have no free blocks. In other words, if there are no free count entry structures (since there are none with a non-zero free count number), the memory pool list head 80 may be directed to point to this fourth linked list. As spanning blocks are allocated and released, the fourth linked list is properly modified. These blocks are used last since their use implies that two banks cannot be powered down during deep sleep. Further, it is possible that the entire bank is not used for the memory pool. For example, part of the bank may be used for a different purpose. In this case, all of the blocks in this bank are included in the fourth linked list described above.

The present system has many advantages. First, as described above, volatile memory is one of the largest power consumers during deep sleep mode for low power network devices. Creating a method and system that optimizes memory usage while also minimizing power consumption of the memory during deep sleep mode is very beneficial. In this system, blocks are always allocated from the bank that has the fewest free blocks. This attempts to maximize the possibility that all of the blocks in one or more banks may remain free. Banks in which there are no allocated blocks may be powered off during deep sleep mode, reducing power consumption.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of organizing and allocating blocks from a pool of memory, wherein the pool comprising a plurality of blocks disposed in a plurality of banks, the method comprising:

creating a first linked list to identify free blocks in a bank, wherein the first linked list comprises block structures, each of which points to a free block in a respective bank;

creating a second linked list to identify banks that have a same number of free blocks, wherein the second linked list comprises bank structures;

creating a third linked list comprising free count entry structures, wherein each free count entry structure is associated with a specific number of free blocks and the third linked list of free count entry structures is arranged in ascending order of free blocks;

pointing a memory pool list head to a head of the third linked list;

receiving a request from user level software for a free block; and traversing the third linked list, the second linked list and the first linked list to find a next free block to be allocated to the user level software.

2. The method of claim 1, wherein a time to find the next free block to be allocated to the user level software is deterministic.

3. The method of claim 1, wherein the next free block is allocated from a bank with the fewest free blocks.

4. The method of claim 1, wherein each free count entry structure comprises:

a next pointer to a next free count entry structure in the third linked list;

a previous pointer to a previous free count entry structure in the third linked list;

a free count number, which is a number of free blocks disposed in each bank associated with this free count entry structure; and a bank head pointer to a first bank structure that comprises the number of free blocks associated with this free count entry structure.

5. The method of claim 4, wherein each bank structure comprises:

a next bank pointer to a next bank structure in the second linked list;

a previous bank pointer to a previous bank structure in the second linked list; and a block head pointer to a first block structure associated with the bank.

6. The method of claim 5, wherein each bank structure comprises a pointer to an associated free count entry structure.

7. The method of claim 5, wherein each block structure comprises:

an address of a block; and a next block pointer to a next block structure in the first linked list.

8. The method of claim 7, wherein the next free block is determined by:

using a bank head pointer disposed in a free count entry structure pointed to by the memory pool list head to find a bank structure having a minimum number of free blocks;

using the block head pointer in the bank structure having the minimum number of free blocks to find a first block structure in a bank; and returning the address of the block found in the first block structure as the address of the next free block.

9. The method of claim 8, further comprising updating the first linked list, the second linked list and the third linked list after the block has been allocated.

10. The method of claim 9, wherein the first linked list is updated by setting the block head pointer of the bank structure to the address found in the next block pointer of the block structure of the block that was allocated.

11. The method of claim 9, wherein the second linked list is updated by decoupling the bank structure from the second linked list.

12. The method of claim 9, wherein the third linked list is updated by attaching the bank structure to a free count entry structure that has a free count number that is one less than the free count entry structure that the bank structure was previously attached to.

13. The method of claim 12, wherein a free count entry structure that has a free count number that is one less than the free count entry structure that the bank structure was previously attached to already exists, and the bank structure is incorporated into the free count entry structure that has a free count number that is one less than the free count entry structure that the bank structure was previously attached to.

14. The method of claim 12, wherein the free count entry structure that has a free count number that is one less than the free count entry structure that the bank structure was previously attached to does not exist, and the method further comprises creating a new free count entry structure and attaching the bank structure to the new free count entry structure.

15. A device comprising:

a processing unit;

a data memory device comprising a plurality of banks which may be powered independently; and a memory device, in communication with the processing unit, comprising instructions, which when executed by the processing unit, enable the device to:

use a first linked list, a second linked list and a third linked list to determine an address of a free block to allocate to user level software, wherein the first linked list is used to identify free blocks in a bank, and the first linked list comprises block structures, each of which points to a free block in a respective bank and wherein the free block to be allocated is disposed in a bank having a fewest number of free blocks.

16. The device of claim 15, wherein the second linked list is used to identify banks that have a same number of free blocks, and wherein the second linked list comprises bank structures.

17. The device of claim 15, wherein the third linked list comprising free count entry structures, wherein each free count entry structure is associated with a specific number of free blocks and the third linked list of free count entry structures is arranged in ascending order of free blocks.

* * * * *